United States Patent
Nowozin et al.

(10) Patent No.: US 10,417,575 B2
(45) Date of Patent: Sep. 17, 2019

(54) RESOURCE ALLOCATION FOR MACHINE LEARNING

(71) Applicant: Microsoft Technology Licensing, LLC, Redmond, WA (US)

(72) Inventors: Reinhard Sebastian Bernhard Nowozin, Cambridge (GB); Po-Ling Loh, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/714,610

(22) Filed: Dec. 14, 2012

(65) Prior Publication Data

US 2014/0172753 A1 Jun. 19, 2014

(51) Int. Cl.
*G06N 20/00* (2019.01)

(52) U.S. Cl.
CPC .................. *G06N 20/00* (2019.01)

(58) Field of Classification Search
CPC ...... G06N 99/005; G06N 5/025; G06N 7/005; G06K 9/6256; G06K 9/6269
USPC .......................................................... 706/12
See application file for complete search history.

(56) References Cited

U.S. PATENT DOCUMENTS

| | | | |
|---|---|---|---|
| 7,277,574 B2 * | 10/2007 | Liu | G06K 9/6228 382/159 |
| 7,822,730 B2 | 10/2010 | Fan et al. | |
| 7,937,336 B1 * | 5/2011 | Maynard-Zhang | H04L 29/1299 706/12 |
| 2003/0065409 A1 * | 4/2003 | Raeth | G05B 9/02 700/31 |
| 2003/0189904 A1 * | 10/2003 | Li | H04L 41/142 370/252 |
| 2003/0223637 A1 * | 12/2003 | Simske | G06F 17/30011 382/176 |

(Continued)

FOREIGN PATENT DOCUMENTS

| | | |
|---|---|---|
| CN | 102591459 A | 7/2012 |
| RU | 2329538 C2 | 7/2008 |

OTHER PUBLICATIONS

Maron, et al., "The Racing Algorithm: Model Selection for Lazy Learners", In Journal of the Artificial Intelligence Review, vol. 11, Issue 1-5, Feb. 1997, 35 pages.

(Continued)

*Primary Examiner* — Scott A. Waldron
*Assistant Examiner* — Viker A Lamardo

(57) ABSTRACT

Resource allocation for machine learning is described such as for selecting between many possible options, for example, as part of an efficient training process for random decision tree training, for selecting which of many families of models best describes data, for selecting which of many features best classifies items. In various examples samples of information about uncertain options are used to score the options. In various examples, confidence intervals are calculated for the scores and used to select one or more of the options. In examples, the scores of the options may be bounded difference statistics which change little as any sample is omitted from the calculation of the score. In an example, random decision tree training is made more efficient while retaining accuracy for applications not limited to human body pose detection from depth images.

20 Claims, 11 Drawing Sheets

(56) References Cited

U.S. PATENT DOCUMENTS

| | | | |
|---|---|---|---|
| 2006/0088894 A1* | 4/2006 | Wright | C12Q 1/6886 435/7.23 |
| 2007/0288414 A1 | 12/2007 | Barajas et al. | |
| 2008/0319933 A1* | 12/2008 | Moussa | G06N 3/02 706/31 |
| 2010/0106714 A1 | 4/2010 | Lim et al. | |
| 2011/0086777 A1* | 4/2011 | Carayol | C12Q 1/6883 506/9 |
| 2011/0144914 A1* | 6/2011 | Harrington | C12Q 1/6883 702/19 |
| 2011/0238605 A1* | 9/2011 | Tateno | G06F 17/30707 706/12 |
| 2012/0056846 A1* | 3/2012 | Zaliva | G06F 3/0416 345/174 |
| 2012/0089455 A1* | 4/2012 | Belani | G06Q 30/0245 705/14.44 |
| 2012/0158623 A1 | 6/2012 | Bilenko et al. | |
| 2012/0209652 A1 | 8/2012 | Khosla et al. | |
| 2012/0209707 A1 | 8/2012 | Ramer et al. | |
| 2012/0328606 A1* | 12/2012 | Gossage | G01N 33/56972 424/133.1 |

OTHER PUBLICATIONS

Birattari, et al., "A Racing Algorithm for Configuring Metaheuristics", In Proceedings of the Genetic and Evolutionary Computation Conference, Jul. 9, 2002, 8 pages.

Blachnik, et al., "Selection of Prototype Rules: Context Searching via Clustering", In Proceedings of the 8th International Conference on Artificial Intelligence and Soft Computing, Jun. 25, 2006, 10 pages.

Yuan, et al., "Statistical Racing Techniques for Improved Empirical Evaluation of Evolutionary Algorithms", In Proceedings of the 8th International Conference on Parallel Problem Solving from Nature, Sep. 18, 2004, 10 pages.

Heidrich-Meisner, et al., "Non-Linearly Increasing Resampling in Racing Algorithms", In Proceedings of the European Symposium on Artificial Neural Networks, Computational Intelligence and Machine Learning, Apr. 27, 2011, 6 pages.

Yeh, et al., "An Empirical Study of Hoeffding Racing for Model Selection in k-Nearest Neighbor Classification", In Proceedings of the 6th International Conference on Intelligent Data Engineering and Automated Learning, Jul. 6, 2005, 8 pages.

Maron, et al, "Hoeffding Races: Accelerating Model Selection Search for Classification and Function Approximation", Retrieved on: Oct. 5, 2012, Available at: http://www.ri.cmu.edu/pub_files/pub1/maron_o_1993_1/maron_o_1993_1.pdf.

Domingos, et al., "Mining High-Speed Data Streams", In Proceedings of the Sixth ACM International Conference on Knowledge Discovery and Data Mining, Aug. 20, 2000, 10 pages.

Jin, et al., "Efficient Decision Tree Construction on Streaming Data", In Proceedings of the Ninth ACM International Conference on Knowledge Discovery and Data Mining, Aug. 24, 2003, 10 pages.

Even-Dar, et al., "Action Elimination and Stopping Conditions for the Multi-Armed Bandit and Reinforcement Learning Problems", In Journal of Machine Learning Research, vol. 7, Issue 6, Jun. 2006, 27 pages.

Hoeffding, Wassily, "Probability Inequalities for Sums of Bounded Random Variables", In Journal of the American Statistical Association, vol. 58, Issue 301, Mar. 1963, 19 pages.

McDiarmid, Colin, "On the Method of Bounded Differences", n Proceedings of the Twelth British Combinatorial Conference, Aug. 1989, 41 pages.

Antos, et al., "Convergence Properties of Functional Estimates for Discrete Distributions", In Journal of Random Structures & Algorithms, vol. 19, Issue 3-4, Oct. 2001, 31 pages.

Harris, Bernard, "The Statistical Estimation of Entropy in the Non-parametric Case", In Technical Summary Report, Dec. 1975, 47 pages.

Schurmann, Thomas, "Bias Analysis in Entropy Estimation", In Journal of Physics A Mathematical and General, vol. 37, Jul. 19, 2004, 5 pages.

Boucheron, et al., "Concentration Inequalities using the Entropy Method", In Proceedings of the Annals of Probability, vol. 31, Issue 3, Jul. 2003, 32 pages.

Efron, et al., "The Jackknife Estimator of Variance", In Proceedings of the Annals of Statistics, vol. 9, Issue 3, May 1981, 12 pages.

Steele, J. Michael, "An Efron-Stein Inequality for Non-Symmetric Statistics", In Proceedings of the Annals of Statistics, vol. 14, Issue 2, Jun. 1986, 6 pages.

Beygelzimer, et al., "Contextual Bandit Algorithms with Supervised Learning Guarantees", In Proceedings of the 14th International Conference on Artificial Intelligence and Statistics, Apr. 11, 2011, 8 pages.

Seldin, et al., "PAC-Bayes-Bernstein Inequality for Martingales and its Application to Multiarmed Bandits", In Journal of Machine Learning Research: Proceedings Track, vol. 26, Jan. 30, 2012, 14 pages.

Peel et al., "Empirical Bernstein Inequalities for U-Statistics", Version 1, Oct. 22, 2011, 9 pages.

Bifet et al., "MOA: Massive Online Analysis", In Journal of Machine Learning Research 11, 2010, 4 pages.

Stahl et al., "Pocket Data Mining: Towards Collaborative Data Mining in Mobile Computing Environments", In: IEEE 22nd International Conference on Tools with Artificial Intelligence (ICTAI 2010), 10 pages.

Mnih et al., "Empirical Bernstein Stopping" Appearing in Proceedings of the 25th International Conference on Machine Learning, Helsinki, Finland, 2008, 8 pages.

Ikonomovska et al., "Learning model trees from evolving data streams", In The Author(s) 2010, Oct. 15, 2010, 41 pages.

Criminisi et al., "Unified Framework for Classification, Regression, Density Estimation, Manifold Learning and Semi-Supervised Learning", In Foundations and Trends in Computer Graphics and Vision, 7 (2-3), pp. 81-227, 2012.

"International Search Report & Written Opinion for PCT Patent Application No. PCT/US2013/075209", dated Apr. 16, 2014, Filed Date: Dec. 14, 2013, 12 Pages.

Pfahringer, et al., "New Options for Hoeffding Trees", In Proceedings of the 20th Australian joint conference on Advances in artificial intelligence, Dec. 2, 2007, pp. 90-99.

Nandagaonkar, et al., "Efficient Decision Tree Construction for Classifying Numerical Data", In Proceedings of the International Conference on Advances in Recent Technologies in Communication and Computing, Oct. 27, 2009, pp. 761-765.

Rehman, et al., "Exploiting Empirical Variance for Data Stream Classification", In Journal of Shanghai Jiaotong University (Science), vol. 17, Issue 2, Apr. 2012, pp. 245-250.

Heidrich-Meisner, et al., "Hoeffding and Bernstein Races for Selecting Policies in Evolutionary Direct Policy Search", In Proceedings of the 26th Annual International Conference on Machine Learning, 2009, pp. 1-8.

Loh, et al., "Faster Hoeffding Racing: Bernstein Races via Jackknife Estimates", In Algorithmic Learning Theory—Lecture Notes in Computer Science, vol. 8139, Oct. 6, 2013, pp. 203-217.

"First Office Action and Search Report Issued in Chinese Patent Application No. 201380064897.8", dated Mar. 29, 2017, 14 Pages.

"Office Action Issued in European Application No. 13821244.4", dated Jul. 20, 2016, 6 Pages.

"Office Action Issued in Russian Patent Application No. 2015122759", dated Jul. 30, 2015, 2 Pages.

"International Preliminary Report on Patentability Issued in PCT Application No. PCT/US2013/075209", dated Mar. 3, 2015, 7 Pages.

"Second Written Opinion Issued in PCT Application No. PCT/US2013/075209", dated Nov. 12, 2014, 5 Pages.

"Second Office Action Issued in Chinese Patent Application No. 201380064897.8", dated Nov. 1, 2017, 9 Pages.

"Office Action Issued in Japanese Patent Application No. 2015-548027", dated Oct. 23, 2017, 3 Pages.

"Notice of Allowance Issued in Russian Patent Application No. 2015122759", dated Dec. 1, 2017, 14 Pages.

(56) References Cited

OTHER PUBLICATIONS

"Third Office Action Issued in Chinese Patent Application No. 201380064897.8", dated May 8, 2018, 10 Pages.
"Office Action Issued in Chinese Patent Application No. 201380064897.8", dated Sep. 3, 2018, 7 Pages.

* cited by examiner

RESOURCE ALLOCATION FOR MACHINE LEARNING

BACKGROUND

Many present-day machine learning systems suffer from significant computational challenges due to massive amounts of data. Modern machine learning systems often process millions of cheaply-acquired samples, generating a significant computational burden. For these systems, making inferences as efficiently as possible based on very large amounts of data is an ongoing challenge. For example, machine learning systems seek to assess how much data needs to be processed and in what order before making a decision that is correct within a workable error tolerance. Finite computing resources are typically available and the machine learning system needs to allocate the resources appropriately.

Often machine learning systems are concerned with the efficient allocation of finite resources where there is uncertainty about options. For example, finding out which of many possible advertisements to show to a customer allocates a resource (computing resource, screen space) to one possible option (a single advertisement). Showing an advertisement and observing the user response (click/no click) reveals partial information about the advertisement impression that can be used to perform better allocations of the resources in future.

The embodiments described below are not limited to implementations which solve any or all of the disadvantages of known machine learning systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Resource allocation for machine learning is described such as for selecting between many possible options, for example, as part of an efficient training process for random decision tree training, for selecting which of many families of models best describes data, for selecting which of many features best classifies items. In various examples samples of information about uncertain options are used to score the options. In various examples, confidence intervals are calculated for the scores and used to select one or more of the options. In examples, the scores of the options may be bounded difference statistics which change little as any sample is omitted from the calculation of the score. In an example, random decision tree training is made more efficient whilst retaining accuracy for applications not limited to human body pose detection from depth images.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a machine learning system for controlling a game, the system described is provided as an example and not a limitation. As those skilled in the art will appreciate, the present examples are suitable for application in a variety of different types of machine learning systems.

Figure 1:
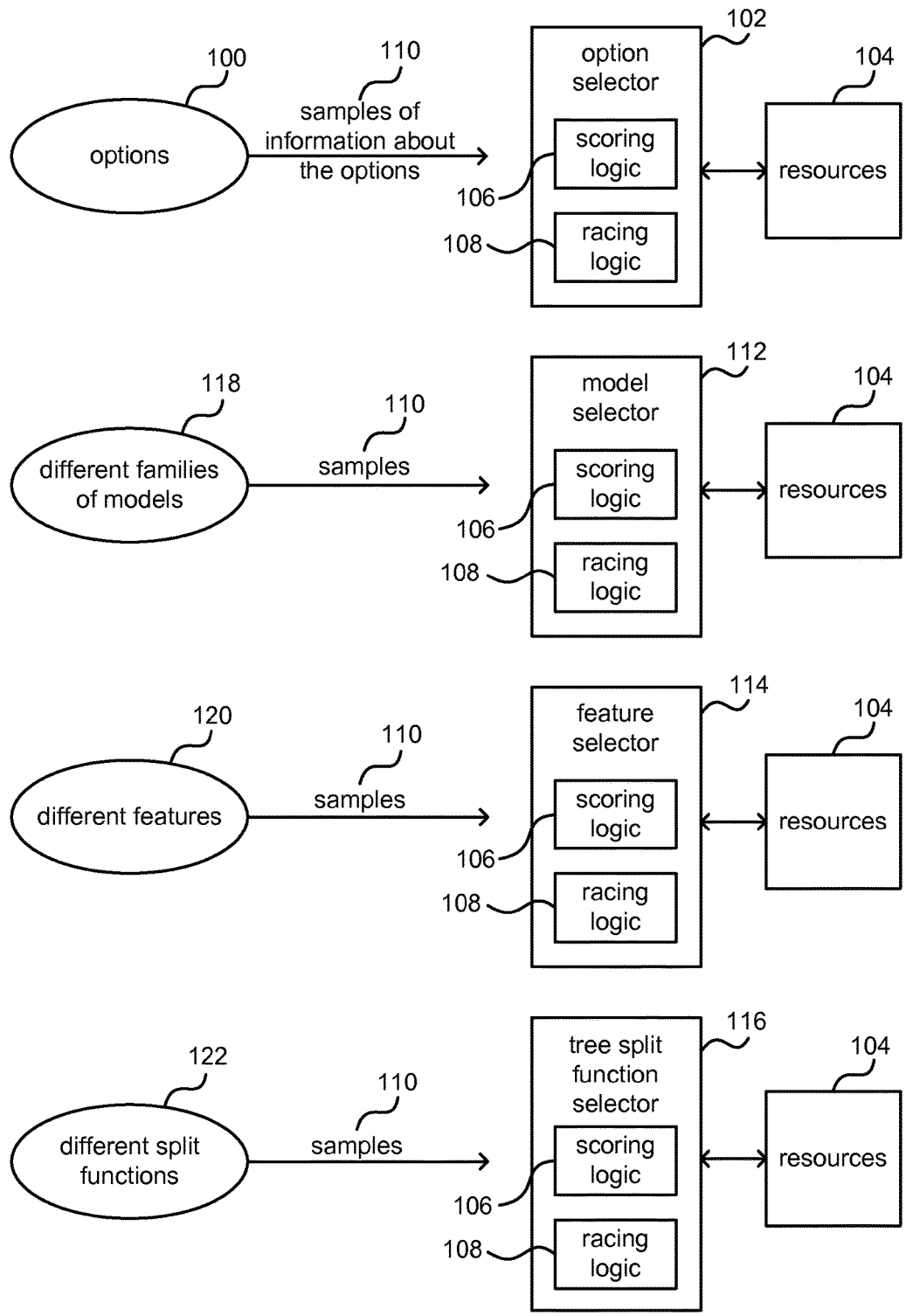
FIG. 1 is a schematic diagram of an option selector which may be a component of a machine learning system; and also of a model selector, a feature selector and a tree split function selector, each of which may be a component of a machine learning system.

FIG. 1 is a schematic diagram of an option selector 102 which is a component of a machine learning system; and also of a model selector 112, a feature selector 114 and a tree split function selector 116, each of which may be a component of a machine learning system.

The option selector selects one or more options from a plurality of options 100 by evaluating scores of the options using a scoring logic 106 and samples 110 of information about the options. There is uncertainty about the options as information about the options is available from samples 110 which become available in an ongoing process. The scoring logic uses a racing logic 108 to speed up the selection process whilst maintaining a specified error tolerance. As a result of the option selection, resources 104 may be allocated. For example, each option may be an advertisement and the resources 104 may be computing resources and screen space for presenting an impression of the advertisement to a user. Each sample 110 may be an advertisement impression and an observed user response to the advertisement impression (e.g. click/no click response). The option selector may calculate a score for the advertisement using the scoring logic 106 and the samples. After many thousands or more of samples have been observed the scores for each advertisement may reach a steady level and these levels may be used by the option selector to allocate the resources 104 by selecting which advertisement to be presented. In order to speed up the process, a racing logic 108 may be used to enable fewer samples to be assessed before the selection is made, but whilst ensuring a specified error tolerance of the selection result.

Each of the option selector 102, scoring logic 106 and racing logic 108 are computer implemented using software and/or hardware. For example, these components may be implemented in whole or in part using hardware logic components. That is, alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

In an example the option selector is a model selector 112. In this situation the options are different families of models 118 which may have different complexity. The samples 110 in this situation may be samples from a system that it is required to model. For example, the samples may be empirical measurements of temperature, rainfall, and other factors where the system to be modeled is a climate system. In another example, the samples may be labeled image elements from training images where the system to be modeled is an image classification system. The model selector produces output comprising one or more of the families of models 118 to be used to model the data (samples). The resources 104 may be computing resources used by the scoring logic and racing logic. The resources 104 may be computing resources used by downstream computation processes which use the family of models selected by the model selector. The scoring logic and the racing logic are used in a similar manner as described above to enable and speed up the selection process.

In an example the option selector is a feature selector 120. In this situation the options are features 120 for example, of a corpus of documents or of images of objects. The samples 110 in this situation may be examples of features together with observations of how well those features classify the documents or objects. The model selector produces output comprising features selected as being good at classifying the documents or objects. The resources 104 may be computing resources used by the scoring logic and racing logic. The resources 104 may be computing resources used by downstream computation processes which use the features selected by the feature selector. The scoring logic and the racing logic are used in a similar manner as described above to enable and speed up the selection process.

In an example the option selector is a tree split function selector 116 which is part of a machine learning system for training random decision trees. A random decision tree is a type of data structure used to store data accumulated during a training phase so that it may be used to make predictions about examples previously unseen by the random decision tree. A random decision tree is usually used as part of an ensemble of random decision trees trained for a particular application domain in order to achieve generalization (that is, being able to make good predictions about examples which are unlike those used to train the forest). A random decision tree has a root node, a plurality of split nodes and a plurality of leaf nodes. During training the structure of the tree (the number of nodes and how they are connected) is learnt as well as split functions to be used at each of the split nodes. In addition, data is accumulated at the leaf nodes during training.

The split functions may be randomly generated and may comprise the options 122 of FIG. 1. Data (such as an image element of an image) may be pushed through trees of a random decision forest from the root to a leaf in a process whereby a decision is made at each split node. The decision may be made according to characteristics of the image element and the split function associated with the split node. The image element proceeds to the next level of the tree down a branch chosen according to the results of the decision.

The tree split function selector 116 selects which of the split functions to use at particular split nodes of the decision tree. In order to make the selection samples 110 are used, which are training data examples. For example, the training data examples may be image elements which are labeled as belonging to a particular class or may be other labeled or unlabeled training data. The scoring logic 106 calculates a score for the different split function options 122 using the samples 110. The racing logic 108 may be used to speed up the selection process as described in more detail below with reference to FIGS. 3, 4, 7 and 8. The resources 104 may be computing resources used by the scoring logic and racing logic. The resources 104 may be computing resources used by downstream computation processes which use the tree split function selected by the model selector.

In the examples described with reference to FIG. 1 the scoring logic 106 is used to evaluate a score for each of the options 100. For example, the score may be based on a statistic describing behavior of an option, such as an average, median, mode or other statistic. In various examples the score is based on a statistic which is a bounded difference statistic. A bounded difference statistic is a numerical value which describes behavior of an entity (such as an option in the examples of FIG. 1) from a plurality of observations (samples) of the behavior; and which changes its numerical value only a little if only one of the plurality of observations is changed. In some examples, changing an observation may be achieved by omitting the observation. A non-exhaustive list of examples of bounded difference statistics is: variance, entropy, information gain, gini index.

Figure 2:
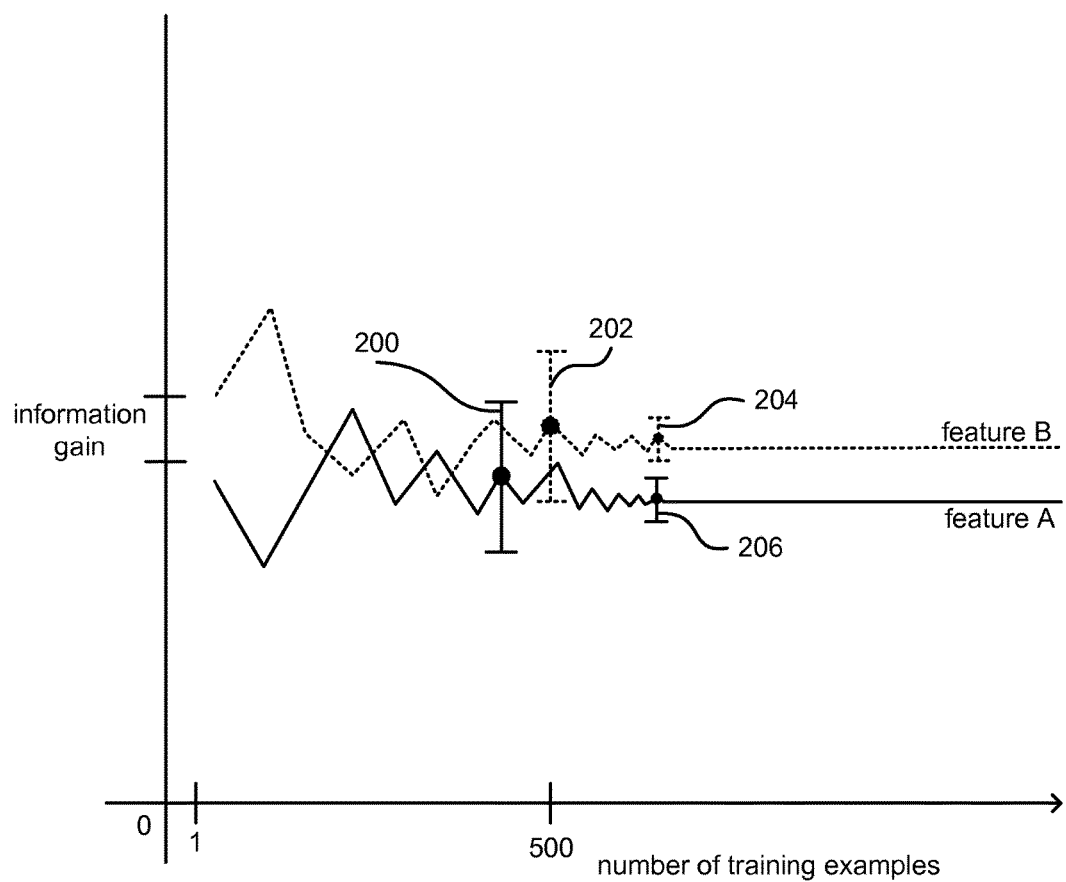
FIG. 2 is a graph of information gain against number of training examples.

FIG. 2 is a graph of information gain against number of training examples. Information gain is an example of a bounded difference statistic which may be measured by the scoring logic as training examples are received. In the example of FIG. 2 there are two options which are feature A and feature B. although in practice many more options may be present (two are shown for clarity). Information gain scores for feature A are plotted as a solid line and information gain scores for feature B are plotted as a dotted line. Suppose the option selector is the feature selector 114 of FIG. 1 and needs to find the feature with the highest information gain. As samples are initially received the information gain score is noisy because only a few samples are available. Once more than 500 samples have been received the information gain scores settled down and are clearly separated for features A and B with feature B having a higher information gain score. The feature selector 114 is designed to take a decision as to whether feature A or feature B has the highest information gain score at an optimal point. That is, after just enough training examples have been received to give an answer which is accurate within a specified error tolerance. This enables computational resources to be allocated appropriately both for the feature selection process itself and for downstream processes which use the feature selection results.

The feature selector 114 may have a racing logic 108 which calculates error bars also known as confidence intervals for the information gain scores (or scores of another bounded difference statistic). A confidence interval is a range of numerical values representing possible values of a score with a specified accuracy. In FIG. 2 a confidence interval 200 is shown for feature A's information gain score when the number of training examples is just less than 500. When the number of training examples is over 500 the confidence interval 206 for feature A's score has a smaller range because there is more certainty about the information gain. In the same way a confidence interval 202 for feature B's score is large when the number of training examples is around 500 and is a smaller confidence interval 204 when the number of training examples increases. The racing logic may use the confidence intervals to decide whether enough training examples have been received to give an option selection which is accurate within a specified error tolerance. For example, options where the confidence interval is not overlapping with the confidence interval for the highest scoring option may be rejected. Gradually the number of options reduces as more and more options are rejected from the race as the number of samples increases. This is now explained with reference to FIG. 3 which is a flow diagram of a method at an option selector which may be any of the option selector 102, model selector 112, feature selector 114 or tree split function selector 116 of FIG. 1.

The option selector sets 300 an error tolerance which is to be used by the racing logic when it decides whether enough training examples have been received to give an option selection which is accurate within the set error tolerance. The error tolerance may be set according to user input, may be pre-configured, or may be automatically selected according to the application domain, the available computational resources, and other factors.

The option selector accesses 302 a list or other information identifying the potential options and receives 304 one or more training examples for each of the options. For example, the options may be randomly generated decision tree split functions from a decision tree training process. The training examples may be accessed from a data store, data stream or other source. The option selector uses the scoring logic 106 to calculate 306 a score for each of the options using the received training examples. For example, the score is a bounded difference statistic as described above. The racing logic 108 is used to calculate 308 a confidence interval for the score for each option. The racing logic 108 identifies those options which meet confidence interval conditions. For example, options whose confidence intervals do not overlap with the confidence interval of the highest scoring option are identified. The identified options are removed 314 from the list of potential options at step 302 and the process may repeat until only one option remains 312 or only a specified number of options remains.

Figure 3:
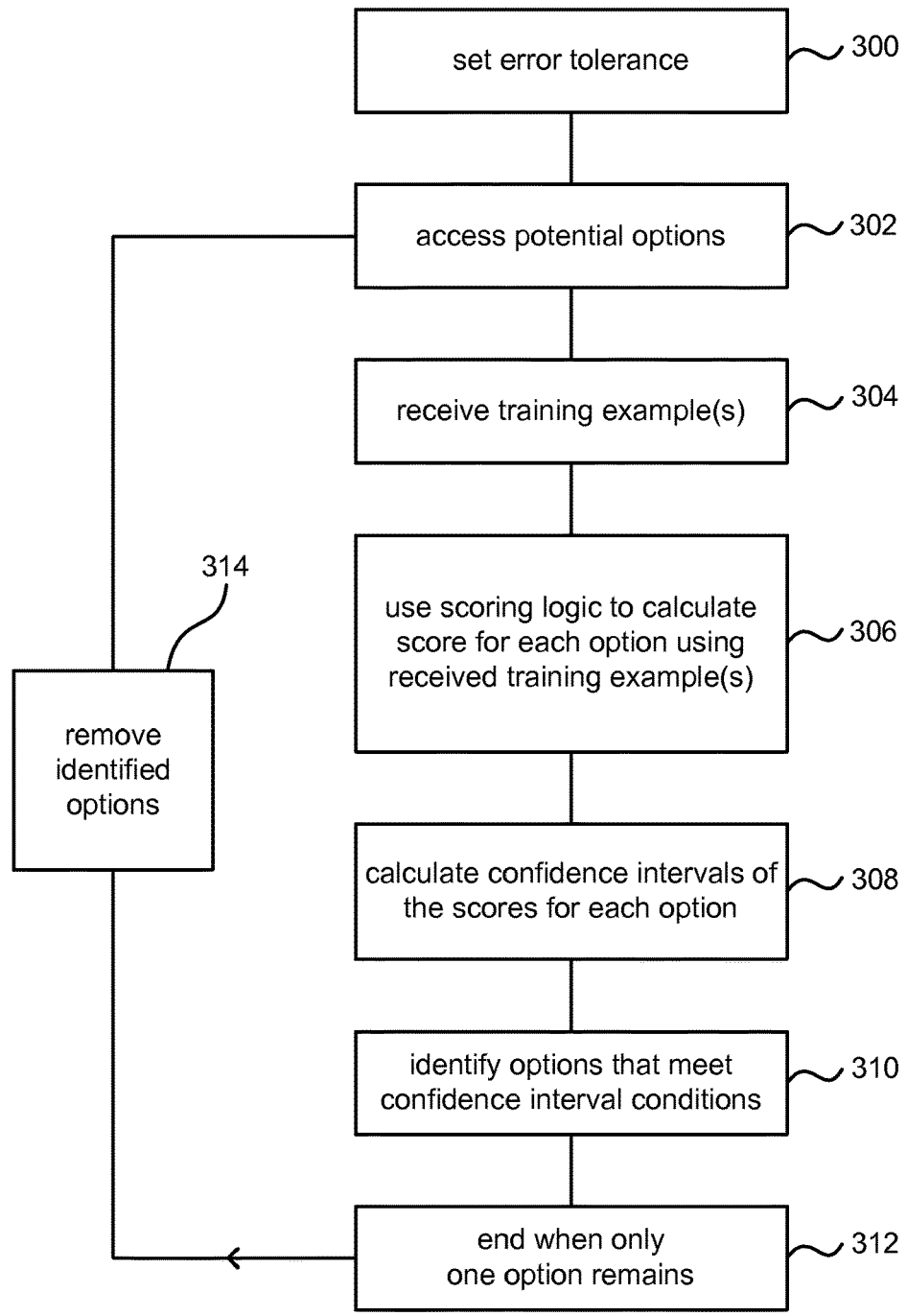
FIG. 3 is a flow diagram of a method at an option selector.
Figure 4:
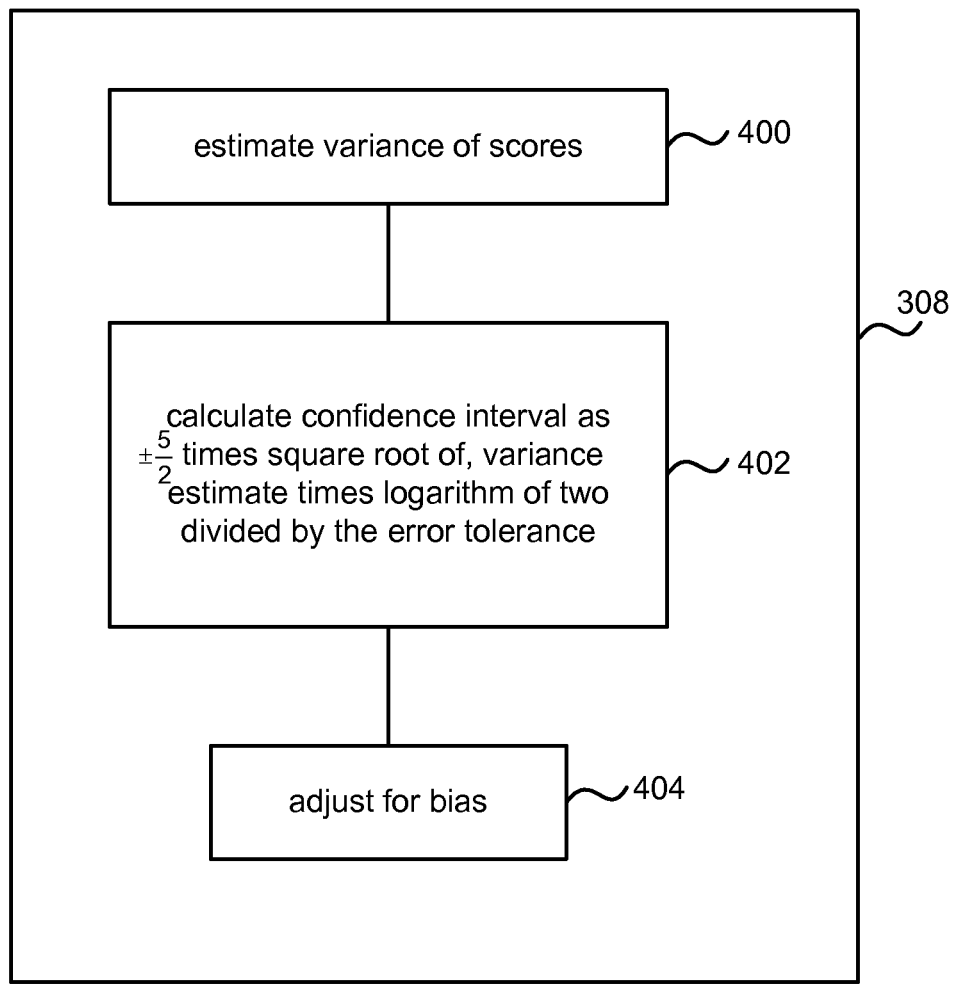
FIG. 4 is a flow diagram of the method of box 308 of FIG. 3 in more detail.

FIG. 4 is a flow diagram of part of the method of FIG. 3 in more detail. The racing logic carries out the method of FIG. 4 during the process of calculating the confidence intervals of the scores for each option (box 308 of FIG. 3). The racing logic estimates 400 a variance of the scores for each option that have been calculated so far. A variance is a numerical value describing how much a quantity varies. Any suitable method of estimating the variance may be used. In some examples a Jack-Knife estimate of variance is used as described in more detail below. A Jack-Knife estimate of variance is made by recalculating the score a plurality of times by removing different ones of the samples in turn. The recalculated scores are then used to estimate the variance by assessing how much they vary from one another.

The racing logic may calculate 402 a confidence interval for one of the options as the score for that option, plus or minus a constant times the square root of, the estimated variance times, a logarithm of two divided by the error tolerance. The constant may take the value 5/2 or a similar value.

The estimated variance may be a jack-knife estimate of variance as described above and may be calculated in any suitable manner. In examples where the options are split function candidates in a random decision tree performing classification, and the score is an information gain or a Gini gain, the jack-knife estimate of variance may be calculated as described in more detail later in this document in order to reduce computation time whilst maintaining accuracy.

In some examples the racing logic may adjust the calculated confidence interval for bias where it is known that the scoring logic calculates the score using a plug-in estimator which introduces bias. However, adjusting for bias is an optional step. Good working results may be achieved when the bias adjustment step is omitted.

More formally, the racing logic may calculate 402 a confidence interval for one of the options as follows:

$$Z - \frac{5}{2}\sqrt{(V_n^J + o(E(V_n^J)))\log\left(\frac{2}{\delta}\right)}$$

$$Z + \left(\frac{5}{2}\sqrt{(V_n^J + o(E(V_n^J)))\log\left(\frac{2}{\delta}\right)} + \text{bias}\right)$$

Which may be expressed in words as a range from the score Z of the option minus 5/2 times the square root of, a Jackknife variance estimate of the variance of the number of samples n plus a correction $o(E(V_n^J))$ times a logarithm of 2 divided by the error tolerance δ to the score Z of the option plus 5/2 times the square root of, a Jackknife variance estimate of the variance of the number of samples n plus a correction $o(E(V_n^J))$ times a logarithm of 2 divided by the error tolerance δ plus a bias term.

In practice it is found that convergence of a Jack-knife estimate of the variance is extremely rapid and the correction terms $o(E(V_n^J))$ may be omitted by the racing logic.

The racing logic may be used to calculate confidence intervals of this form for scores which are based on bounded difference statistics such as for example where the scores are calculated using a histogram of bin counts. This enables the racing logic to give working results for many forms of scores and enables a much wider range of machine learning applications to use the racing logic than previously possible. By increasing or decreasing the size of the error tolerance it is possible to trade off guaranteed accuracy level of the result for computation time.

The racing logic may be arranged to apply a bias correction to the confidence interval as described above, for example, where the score is calculated by the scoring logic using a plug-in estimator such as an entropy estimator, an information gain estimator, a gini index estimator.

In the case that the score is related to information gain, it is found that the bias may be given by:

$$\frac{2(K-1)}{n}$$

Which may be expressed in words as the ratio of: two times, the number of bins of a histogram used to calculate the information gain minus 1, to the number of samples.

In the case that the score is related to a Gini index, it is found that the bias may be given by $$\frac{2(K-1)}{nK}$$

Which may be expressed in words as the ratio of: two times, the number of bins of a histogram used to calculate the Gini index minus 1, to the number of samples times the number of histogram bins.

In the case that the score is a variance gain it is found that no bias term is needed.

As mentioned above a Jack-Knife estimate of variance is made by recalculating the score a plurality of times by removing different ones of the samples in turn (referred to as a leave-out estimate). The recalculated scores are then used to estimate the variance by assessing how much they vary from one another.

In the case that the score is an information gain the JackKnife estimate of variance of the score may be calculated by the racing logic as:

$$\hat{V}_n^J = \frac{n-1}{n} \sum_{b \in \{L,R\}} \sum_{j=1}^{K} h_j^b \left( \hat{I}^{(b,j)} - \bar{I} \right)^2$$

Where the summation is over terms with $h_j^b > 0$. The variance may be computed using weighted online updates. $h_j^b$ is the histogram count in the branch b and bin j. This is a number which is an integer and greater than or equal to zero and smaller than or equal to n, the total number of samples.

The above equality may be expressed in words as, a Jack knife estimate of the variance of an information gain plug-in estimate for n training samples which reach a split node equals the number of training samples minus one, divided by the number of training samples, times the sum over the left and right child nodes of the split node, of the sum over all the histogram bins of the histogram count in the bin j and branch b times the square of the difference between the plug-in estimate of the information gain when one sample is removed from branch b and bin j minus the empirical average of the information gain. Where the empirical average of the information gain is represented by the symbol and is given by:

$$\bar{I} = \frac{1}{2K} \sum_{b \in \{L,R\}} \sum_{j=1}^{K} \hat{I}^{(b,j)}$$

Which may be expressed in words as an empirical average of the information gain is equal to one divided by, two times the number of histogram bins, times the sum over the left and right child nodes of the sum over all the histogram bins of a plug-in estimate of information gain with one sample in branch b and bin j removed.

In the case that the score is a Gini gain the jack knife estimate of variance of the score may be calculated by the racing logic by first computing an empirical average of the Gini gain as follows:

$$\bar{G} = \frac{1}{2K} \sum_{b \in \{L,R\}} \sum_{j=1}^{K} \hat{G}^{(b,j)}$$

Which may be expressed in words as an empirical average of the Gini gain is equal to one divided by, two times the number of histogram bins, times the sum over the left and right child nodes of the sum over all the histogram bins of a plug-in estimate of Gini gain Once the empirical average is computed the racing logic is able to compute:

$$\hat{V}_n^J = \frac{n-1}{n} \sum_{b \in \{L,R\}} \sum_{j=1}^{K} h_j^b \left( \hat{G}^{(b,j)} - \bar{G} \right)^2$$

Where the summation is over terms with $h_j^b > 0$.

The above equality may be expressed in words as, a Jack knife estimate of the variance of a Gini gain plug-in estimate for n training samples which reach a split node equals the number of training samples minus one, divided by the number of training samples, times the sum over the left and right child nodes of the split node, of the sum over all the histogram bins of the histogram count in branch b and bin j times the square of the difference between the plug-in estimate of the Gini gain when removing a single sample at branch b and bin j minus an empirical average of the Gini gains obtained by removing individual samples.

An example is now described in which the option selector is used as a decision tree split function selector for decision tree training in a machine learning system for controlling a game. The decision tree may be trained using the option selector for either a regression or a classification task depending on the machine learning task.

Figure 5:
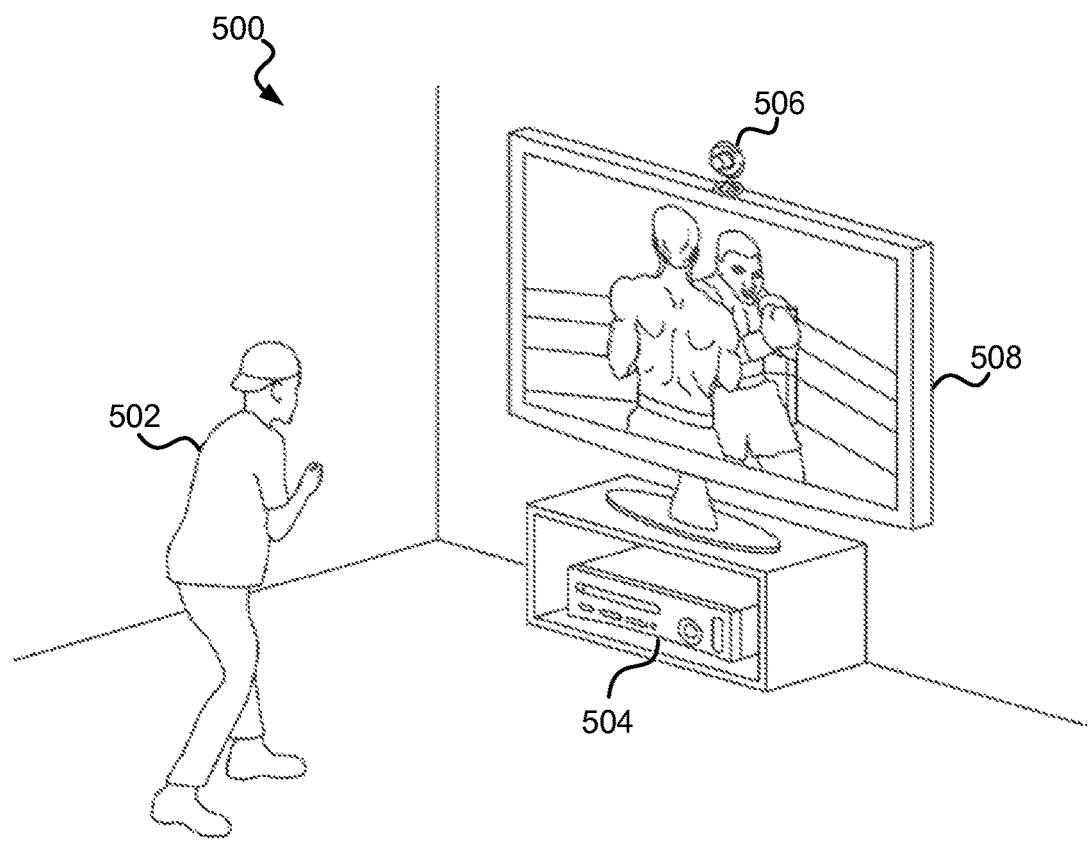
FIG. 5 illustrates an example camera-based machine learning system for controlling a computer game.

FIG. 5 shows an example camera-based control system 500 for controlling a computer game. FIG. 5 shows a user 502 playing, in this illustrative example, a boxing game. In some examples, camera-based control system 500 can be used to, among other things, determine body pose, bind, recognize, analyze, track, associate to a human target, provide feedback, interpret gestures, and/or adapt to aspects of a human target such as the user 502.

The camera-based control system 500 comprises a computing device 504. The computing device 504 can be a general purpose computer, gaming system or console, or dedicated image processing device. The computing device 504 can include hardware components and/or software components such that the computing device 504 can be used to execute applications such as gaming applications and/or non-gaming applications. The structure of the computing device 504 is discussed hereinafter with reference to FIG. 11.

The camera-based control system 100 further comprises a capture device 506. The capture device 506 can be, for example, an image sensor or detector that can be used to visually monitor one or more users (such user 502) such that gestures performed by the one or more users can be captured, analyzed, processed, and tracked to perform one or more controls or actions within a game or application, as described in more detail below.

The camera-based control system 500 can further comprise a display device 508 connected to the computing device 504. The computing device can be a television, a monitor, a high-definition television (HDTV), or the like that can provide game or application visuals (and optionally audio) to the user 502.

In operation, the user 502 can be tracked using the capture device 506 such that the joint positions, movements and size of user 502 can be interpreted by the computing device 504 (and/or the capture device 506) as controls that can be used to affect the application being executed by computing device 504. As a result, the user 502 can move his or her body to control an executed game or application.

In the illustrative example of FIG. 5, the application executing on the computing device 504 is a boxing game that the user 502 is playing. In this example, the computing device 504 controls the display device 508 to provide a visual representation of a boxing opponent to the user 502. The computing device 504 also controls the display device 508 to provide a visual representation of a user avatar that the user 502 can control with his or her movements. For example, the user 502 can throw a punch in physical space to cause the user avatar to throw a punch in game space. Thus, according to this example, the computing device 504 and the capture device 506 of the camera-based control system 500 can be used to recognize and analyze the punch of the user 502 in physical space such that the punch may be interpreted as a game control of the user avatar in game space.

Furthermore, some movements can be interpreted as controls that correspond to actions other than controlling the avatar. For example, the user can use movements to enter, exit, turn system on or off, pause, save a game, select a level, profile or menu, view high scores, communicate with a friend, etc. Additionally, movement of the user 502 can be used and analyzed in any suitable manner to interact with applications other than games, for example to enter text, select icons or menu items, control media playback, browse websites or operate any other controllable aspect of an operating system or application.

Figure 6:
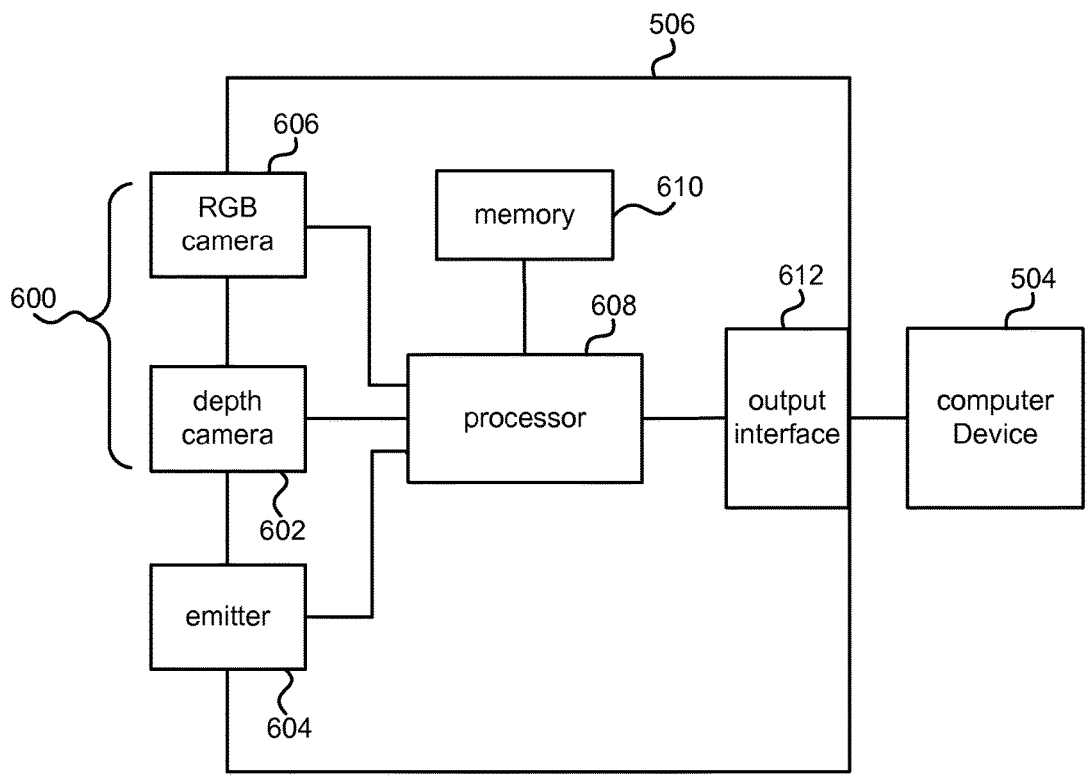
FIG. 6 is a schematic diagram of an image capture device for use with the machine learning system of FIG. 6.

Reference is now made to FIG. 6, which illustrates a schematic diagram of the capture device 506 that can be used in the camera-based control system 500 of FIG. 5. In the example of FIG. 6 the capture device 506 is configured to capture video images with depth information. Such a capture device can be referred to as a depth camera. The depth information can be in the form of a depth image that includes depth values, i.e. a value associated with each image element of the depth image that is related to the distance between the depth camera and an item or object located at that image element.

The depth information can be obtained using any suitable technique including, for example, time-of-flight, structured light, stereo image, or the like. In some examples, the capture device 506 can organize the depth information into "Z layers," or layers that may be perpendicular to a Z-axis extending from the depth camera along its line of sight.

As shown in FIG. 6, the capture device 506 comprises at least one imaging sensor 600. In the example shown in FIG. 6, the imaging sensor 600 comprises a depth camera 602 arranged to capture a depth image of a scene. The captured depth image can include a two-dimensional (2-D) area of the captured scene where each image element in the 2-D area represents a depth value such as a length or distance of an object in the captured scene from the depth camera 602.

The capture device can also include an emitter 604 arranged to illuminate the scene in such a manner that depth information can be ascertained by the depth camera 602. For example, in the case that the depth camera 602 is an infra-red (IR) time-of-flight camera, the emitter 604 emits IR light onto the scene, and the depth camera 602 is arranged to detect backscattered light from the surface of one or more targets and objects in the scene. In some examples, pulsed infrared light can be emitted from the emitter 604 such that the time between an outgoing light pulse and a corresponding incoming light pulse can be detected by the depth camera and measured and used to determine a physical distance from the capture device 506 to a position on the targets or objects in the scene. Additionally, in some examples, the phase of the outgoing light wave from the emitter 604 can be compared to the phase of the incoming light wave at the depth camera 602 to determine a phase shift. The phase shift can then be used to determine a physical distance from the capture device 506 to a position on the targets or objects. In a further example, time-of-flight analysis can be used to indirectly determine a physical distance from the capture device 506 to a position on the targets or objects by analyzing the intensity of the reflected beam of light over time via various techniques including, for example, shuttered light pulse imaging.

In another example, the capture device 506 can use structured light to capture depth information. In such a technique, patterned light (e.g., light displayed as a known pattern such as grid pattern or a stripe pattern) can be projected onto the scene using the emitter 604. Upon striking the surface of one or more targets or objects in the scene, the pattern becomes deformed. Such a deformation of the pattern can be captured by the depth camera 602 and then be analyzed to determine a physical distance from the capture device 506 to a position on the targets or objects in the scene.

In another example, the depth camera 602 can be in the form of two or more physically separated cameras that view a scene from different angles, such that visual stereo data is obtained that can be resolved to generate depth information. In this case the emitter 604 can be used to illuminate the scene or can be omitted.

In some examples, in addition to the depth camera 602, the capture device 506 can comprise a regular video camera, which is referred to as an RGB camera 606. The RGB camera 606 is arranged to capture sequences of images of the scene at visible light frequencies, and can hence provide images that can be used to augment the depth images. In alternative examples, the RGB camera 606 can be used instead of the depth camera 602.

The capture device 506 shown in FIG. 6 further comprises at least one processor 608, which is in communication with the imaging sensor 600 (i.e. depth camera 602 and RGB camera 606 in the example of FIG. 6) and the emitter 604. The processor 608 can be a general purpose microprocessor, or a specialized signal/image processor. The processor 608 is arranged to execute instructions to control the imaging sensor 600 and emitter 604 to capture depth images and/or RGB images. The processor 608 can also optionally be arranged to perform processing on these images, as outlined in more detail hereinafter.

In some examples the imaging sensor is used to provide silhouette images which are two dimensional binary images identifying foreground and background regions of the depth and/or RGB images captured by the imaging sensor. The silhouette images may be formed at the imaging sensor and/or processor 608 from the captured depth and RGB images. The silhouette images may be processed using the methods described herein to predict two dimensional joint positions. In this case the silhouette images can be thought of as depth images flattened to a fixed depth. The captured depth images may be used to predict three dimensional joint positions as described in more detail below.

The capture device 506 shown in FIG. 6 further includes a memory 610 arranged to store the instructions that for execution by the processor 608, images or frames of images captured by the depth camera 602 or RGB camera 606, or any other suitable information, images, or the like. In some examples, the memory 610 can include random access memory (RAM), read only memory (ROM), cache, Flash memory, a hard disk, or any other suitable storage component. The memory 610 can be a separate component in communication with the processor 608 or integrated into the processor 608.

The capture device 506 also comprises an output interface 612 in communication with the processor 608 and is arranged to provide data to the computing device 604 via a communication link. The communication link can be, for example, a wired connection (such as USB, Firewire, Ethernet or similar) and/or a wireless connection (such as WiFi, Bluetooth or similar). In other examples, the output interface 612 can interface with one or more communication networks (such as the internet) and provide data to the computing device 504 via these networks.

Figure 7:
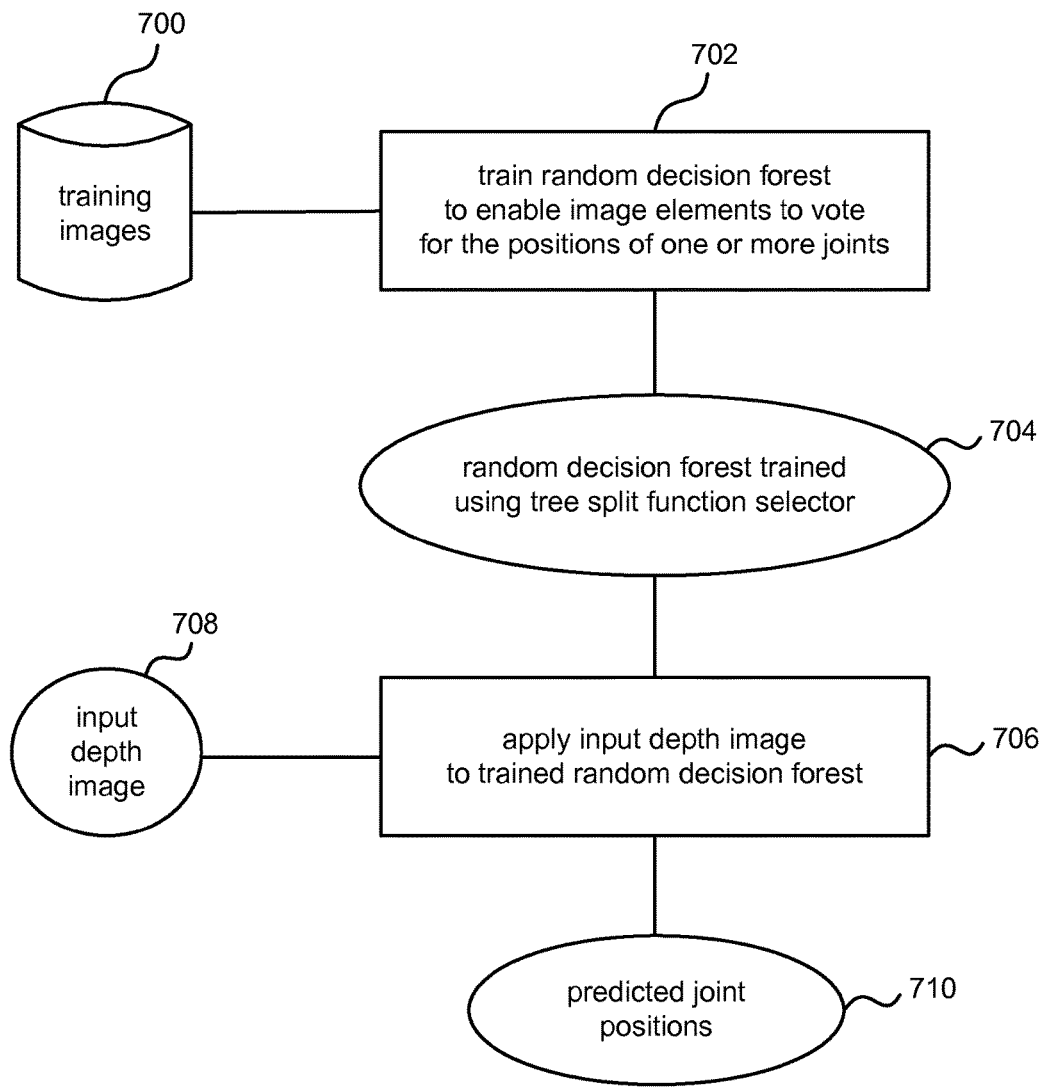
FIG. 7 is a flow diagram of a method of predicting joint positions in an input depth image.

FIG. 7 is a flow diagram of predicting joint positions in an input depth image 708 depicting one or more humans or animals or parts of humans or animals. A plurality of training images 700 which may be depth images that have specified joint positions is available. The images may be two dimensional, three dimensional or higher dimensional images or sequences of such images. The examples described herein use depth images but are also applicable to color images, medical images or other types of image.

A random decision forest is trained 702 to enable image elements of the training images 700 to vote for the positions of one or more joints depicted in those images. The training process may comprise using a tree split function selector as described above with reference to FIG. 1 in order to speed up training whilst maintaining accuracy. The result of the training process is a random decision forest 704 which has been trained using a tree split function selector.

Image elements may be pixels, groups of pixels, voxels, groups of voxels, blobs, patches or other components of an image. A random decision forest comprises one or more decision trees each having a root node, a plurality of split nodes and a plurality of leaf nodes. Image elements of an image may be pushed through trees of a random decision forest from the root to a leaf node in a process whereby a decision is made at each split node. The decision is made according to characteristics of the image element and characteristics of test image elements displaced therefrom by spatial offsets specified by the parameters at the split node. The decision process may be expressed using a split function. At a split node the image element proceeds to the next level of the tree down a branch chosen according to the results of the decision. The random decision forest may use regression or classification as described in more detail below. During training, parameter values (also referred to as features) are learnt for use at the split nodes and data is accumulated at the leaf nodes. The process of learning the parameters comprises selecting a split function for use at the split node. An option selector may be used for this selection process as described with reference to FIG. 1 and using the processes of FIGS. 3 and 4.

Joint position votes may be accumulated at the leaf nodes during training. A joint position vote is an image position (or region) where a joint is predicted to be relative to an image element making the vote. A joint position vote may be specified in any suitable manner. For example, as a vector expressing the relative distance and direction of a predicted joint position from an image element making the vote. It is not essential to use a vector, other formats may be used.

Storing all the joint position votes at the leaf nodes during training may be very memory intensive since large amounts of training data are typically used for practical applications. In some embodiments the votes are aggregated in order that they may be stored in a compact manner. Various different aggregation processes may be used as described in more detail below.

At test time a previously unseen depth image 708 is input to the system to have joint positions predicted. It is applied to the trained random decision forest 706 to obtain predicted joint positions 701. Each image element of the input depth image 708 may be sent through each tree of the trained random decision forest and joint position votes obtained from the leaves. In this way votes may be made by comparing each image element with test image elements displaced therefrom by learnt spatial offsets. Each image element may make a plurality of votes for each joint. These votes may be aggregated according to various different aggregation methods to give the predicted joint positions 710. The test time process is therefore a single stage process of applying the input depth image to the trained random decision forest to directly obtain predicted joint positions. The single stage process does not involve intermediate results such as body parts being predicted. This single stage process may be carried out in a fast and effective manner to give results in real-time and with high quality results.

Figure 8:
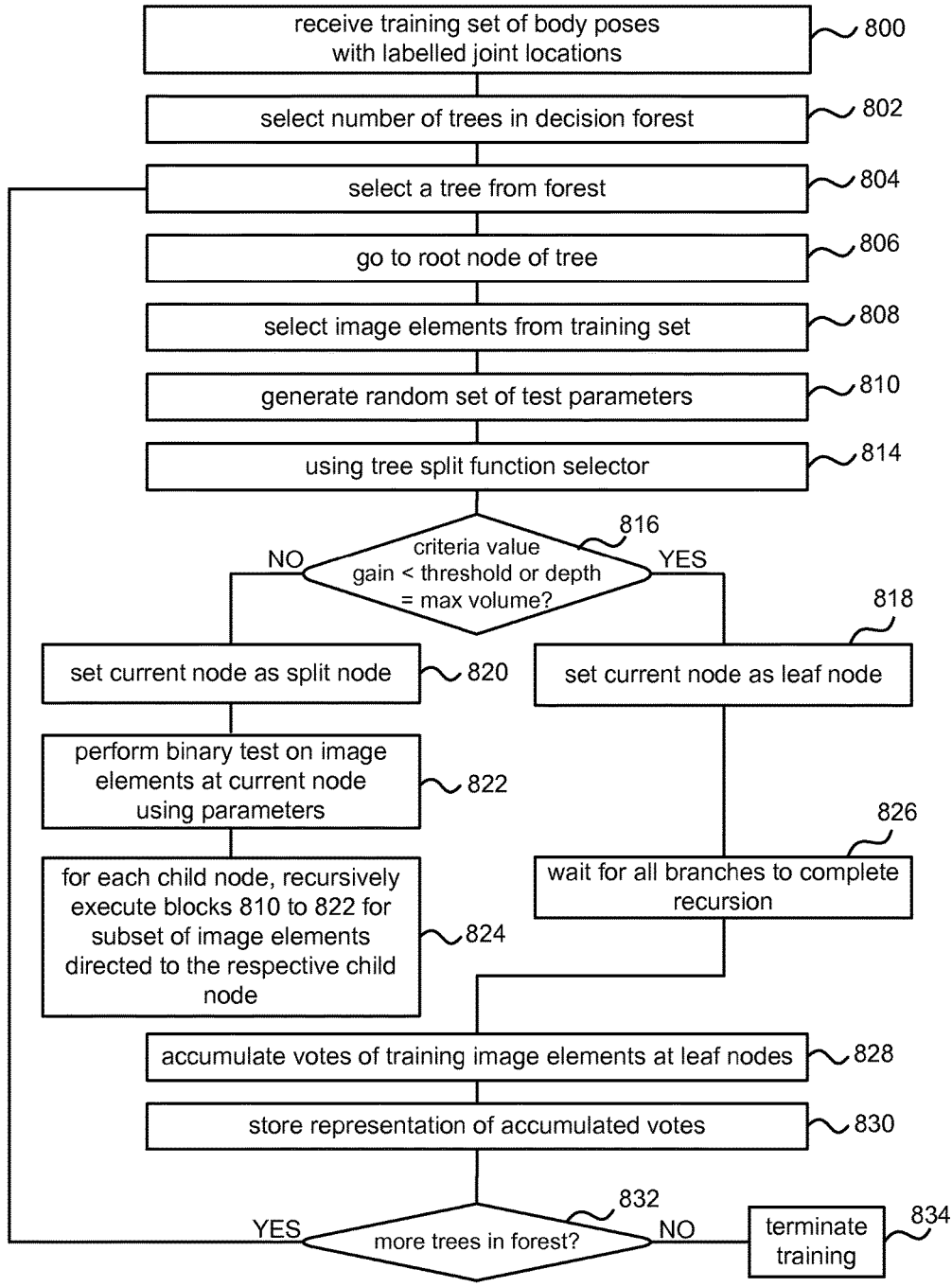
FIG. 8 is a flow diagram of a method of training a random decision forest.

FIG. 8 is a flowchart of a process for training a decision forest to identify joint positions in an image. This can also be thought of as generating joint position votes from image elements of an image. The decision forest is trained using a set of training images. The set of training images comprise a plurality images each showing at least one human or animal or part of a human or animal body. The bodies or body parts depicted in the training images are in various different poses (such as sitting or standing). Joint positions in the training images are specified. Therefore, the training set forms a ground-truth database.

In one example, rather than capturing depth images for many different examples of body poses, the training set can comprise synthetic computer generated images. Such synthetic images realistically model the human or animal body (or parts of the human or animal body) in different poses interacting with different objects, and can be generated to be viewed from any angle or position. They can be produced much more quickly than real depth images, and can provide a wider variety of training images.

Referring to FIG. 8, to train the decision trees, the training set described above is first received 800. The number of decision trees to be used in a random decision forest is selected 802. A random decision forest is a collection of deterministic decision trees. Decision trees can be used in classification or regression algorithms, but can suffer from over-fitting, i.e. poor generalization. However, an ensemble of many randomly trained decision trees (a random forest) yields improved generalization. During the training process, the number of trees is fixed.

Figure 9:
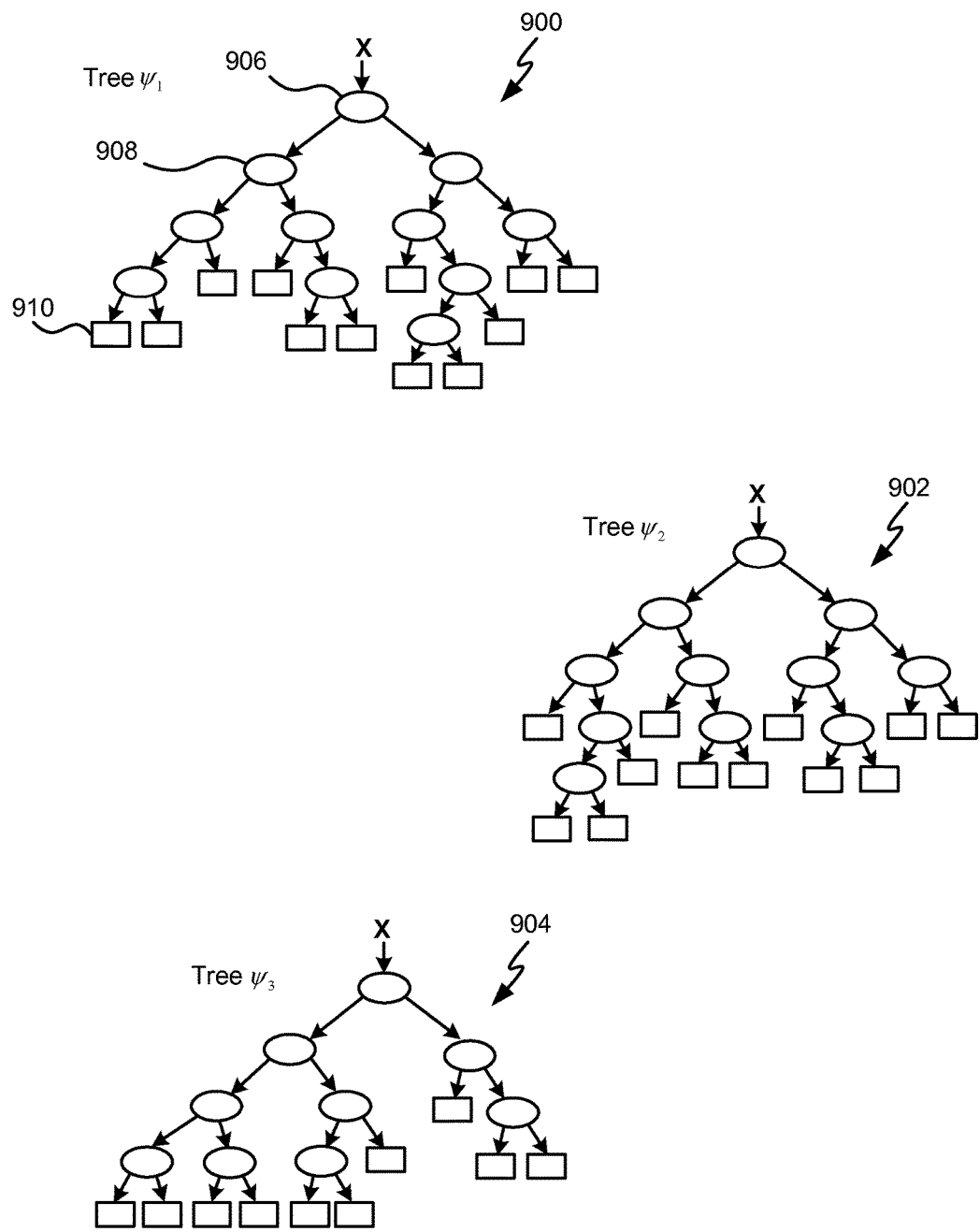
FIG. 9 is a schematic diagram of a random decision forest.

An example random decision forest is shown illustrated in FIG. 9. The illustrative decision forest of FIG. 9 comprises three decision trees: a first tree 900; a second tree 902; and a third tree 904. Each decision tree comprises a root node (e.g. root node 906 of the first decision tree 900), a plurality of internal nodes, called split nodes (e.g. split node 908 of the first decision tree 900), and a plurality of leaf nodes (e.g. leaf node 910 of the first decision tree 900).

In operation, each root and split node of each tree performs a binary test on the input data and based on the result directs the data to the left or right child node. The leaf nodes do not perform any action; they store accumulated joint position votes (and optionally other information). For example, probability distributions may be stored representing the accumulated joint position votes. In some examples the leaf nodes optionally store other information such as probability distributions over body parts. In this case the forest is able to act both as a regression forest to predict joint positions and as a classification forest to predict surface body parts.

The manner in which the parameters used by each of the split nodes are chosen and how the leaf node probabilities may be computed is now described. A decision tree from the decision forest is selected 804 (e.g. the first decision tree 800) and the root node 806 is selected 806. At least a subset of the image elements from each of the training images are then selected 808. For example, the image may be segmented so that image elements in foreground regions are selected. Each selected image element of each training image is associated with a plurality of known joint positions. For example, an image element at the torso may be associated with a known joint position for the left hip and a known joint position for the right hip. In another example, an image element at the torso may be associated with all known joint positions in the image.

A random set of test parameters (which together with the tests form a random set of split functions) are then generated 810 for use by the binary test performed at the root node as candidate features. In one example, the binary test is a function applied to image element x with parameters y, and with the output of the function compared to threshold values. If the result of the test is in the range between the threshold values then the result of the binary test is true. Otherwise, the result of the binary test is false. In other examples, only one of the threshold values may be used, such that the result of the binary test is true if the result is greater than (or alternatively less than) a threshold value. In the example described here, the parameter may define a feature of the image.

The process for generating the parameter can comprise generating random spatial offset values in the form of a two or three dimensional displacement. The result of the split function is then computed by observing the depth value for a test image element which is displaced from the image element of interest x in the image by the spatial offset. The spatial offsets are optionally made depth invariant by scaling by 1/depth of the image element of interest. The threshold values may be used to decide whether the test image element is at a joint position.

The result of the binary (split) test performed at a root node or split node determines which child node an image element is passed to. For example, if the result of the binary test is true, the image element is passed to a first child node, whereas if the result is false, the image element is passed to a second child node.

The random set of test parameters generated comprise a plurality of random values for the split function parameter and the threshold values. In order to inject randomness into the decision trees, the function parameters of each split node are optimized only over a randomly sampled subset of all possible parameters. This is an effective and simple way of injecting randomness into the trees, and increases generalization.

A tree split function selector may be used 814 to select which of the randomly generated split functions to be used at a given split node. This speeds up the training process because it is no longer necessary to apply every combination of test parameters to each image element in the set of training images. This is because the racing logic is able to omit split function options according to the calculated confidence intervals as described above with reference to FIGS. 3 and 4. In this way it is possible to significantly reduce training times whilst maintaining accuracy to a specified amount using the error tolerance value.

The scoring logic calculates a score, also referred to as criteria or objectives. In an example, the calculated score comprise the information gain (also known as the relative entropy). In another example, the calculated score comprises a Gini gain. The split function that optimizes the score (such as maximizing the information gain) is selected 814 and stored at the current node for future use. As an alternative to information gain, other criteria can be used, such as variance, or other bounded difference statistics.

It is then determined 816 whether the value for the calculated score is less than (or greater than) a threshold. If the value for the calculated score is less than the threshold, then this indicates that further expansion of the tree does not provide significant benefit. This gives rise to asymmetrical trees which naturally stop growing when no further nodes are beneficial. In such cases, the current node is set 818 as a leaf node. Similarly, the current depth of the tree is determined (i.e. how many levels of nodes are between the root node and the current node). If this is greater than a predefined maximum value, then the current node is set 818 as a leaf node. Each leaf node has joint position votes which accumulate at that leaf node during the training process as described below.

It is also possible to use another stopping criterion in combination with those already mentioned. For example, to assess the number of example image elements that reach the leaf. If there are too few examples (compared with a threshold for example) then the process may be arranged to stop to avoid overfitting. However, it is not essential to use this stopping criterion.

If the value for the calculated criteria is greater than or equal to the threshold, and the tree depth is less than the maximum value, then the current node is set 820 as a split node. As the current node is a split node, it has child nodes, and the process then moves to training these child nodes. Each child node is trained using a subset of the training image elements at the current node. The subset of image elements sent to a child node is determined using the parameters that optimized the criteria. These parameters are used in the binary test, and the binary test performed 822 on all image elements at the current node. The image elements that pass the binary test form a first subset sent to a first child node, and the image elements that fail the binary test form a second subset sent to a second child node.

For each of the child nodes, the process as outlined in blocks 810 to 822 of FIG. 8 are recursively executed 824 for the subset of image elements directed to the respective child node. In other words, for each child node, new random test parameters are generated 810, applied 812 to the respective subset of image elements, parameters optimizing the criteria selected 814, and the type of node (split or leaf) determined 816. If it is a leaf node, then the current branch of recursion ceases. If it is a split node, binary tests are performed 822 to determine further subsets of image elements and another branch of recursion starts. Therefore, this process recursively moves through the tree, training each node until leaf nodes are reached at each branch. As leaf nodes are reached, the process waits 826 until the nodes in all branches have been trained. Note that, in other examples, the same functionality can be attained using alternative techniques to recursion.

Once all the nodes in the tree have been trained to determine the parameters for the binary test optimizing the criteria at each split node, and leaf nodes have been selected to terminate each branch, then votes may be accumulated 828 at the leaf nodes of the tree. This is the training stage and so particular image elements which reach a given leaf node have specified relative joint position votes known from the ground truth training data. A representation of the accumulated votes may be stored 830 using various different methods. Optionally sampling may be used to select votes to be accumulated and stored in order to maintain a low memory footprint. For example, reservoir sampling may be used whereby a fixed maximum sized sample of votes is taken. Selection may be random or in any other manner.

Once the accumulated votes have been stored it is determined 832 whether more trees are present in the decision forest. If so, then the next tree in the decision forest is selected, and the process repeats. If all the trees in the forest have been trained, and no others remain, then the training process is complete and the process terminates 834.

Therefore, as a result of the training process, one or more decision trees are trained using synthesized or empirical training images. Each tree comprises a plurality of split nodes storing optimized test parameters, and leaf nodes storing associated joint position votes or representations of aggregated joint position votes. Due to the random generation of parameters from a limited subset used at each node, the trees of the forest are distinct (i.e. different) from each other.

The training process may be performed in advance of using the trained prediction system to identify joint positions in a real depth image. The decision forest and the optimized test parameters may be stored on a storage device for use in identifying joint positions in depth images at a later time.

Figure 10:
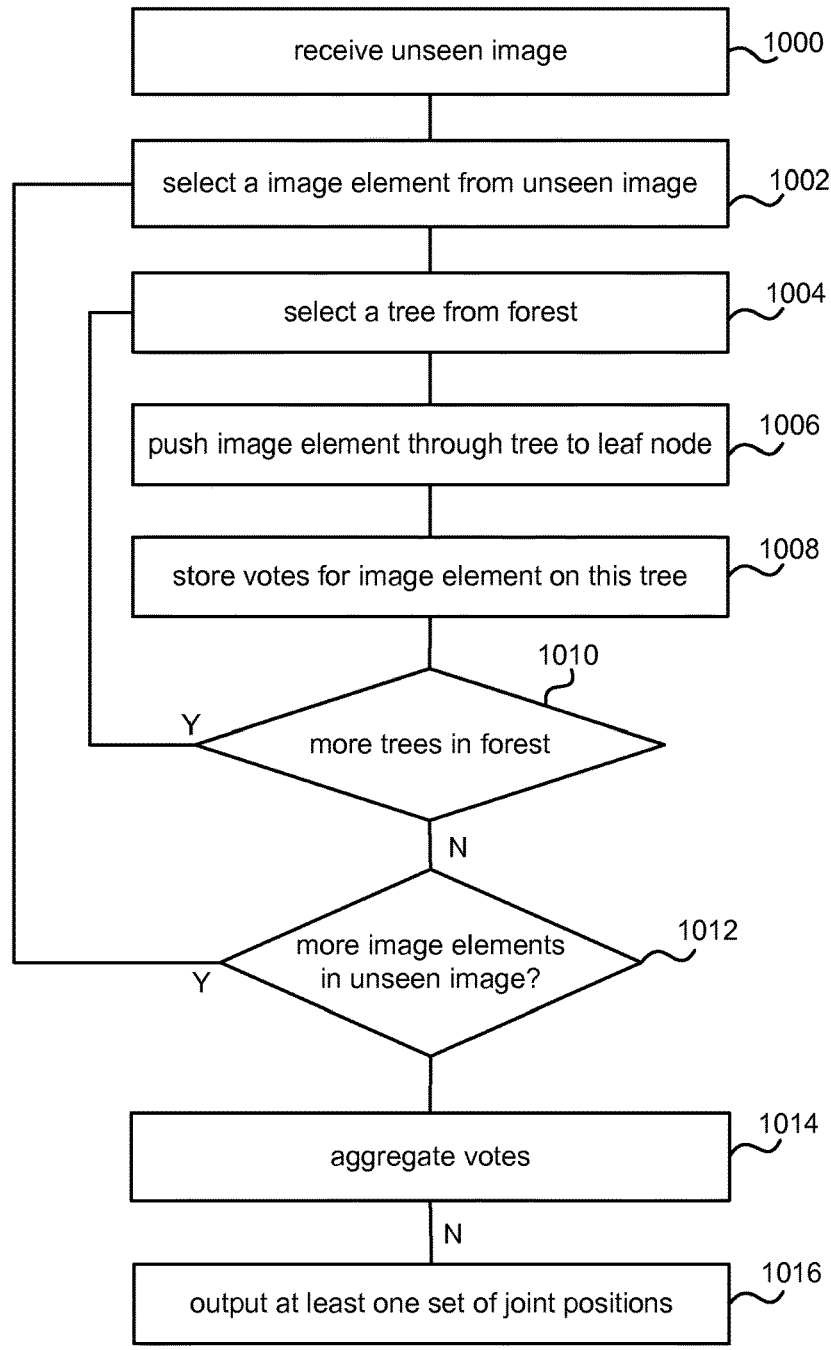
FIG. 10 is a flow diagram of a method of joint position prediction at test time.

FIG. 10 illustrates a flowchart of a process for predicting joint positions in a previously unseen depth image using a decision forest that has been trained as described hereinabove. Firstly, an unseen depth image is received 1000. An image is referred to as 'unseen' to distinguish it from a training image which has the joint positions already specified. Note that the unseen depth image can be pre-processed to an extent, for example to identify foreground regions, which reduces the number of image elements to be processed by the decision forest. However, pre-processing to identify foreground regions is not essential. In some examples the unseen depth image is a silhouette image as described above where the depth image is effectively flattened to a fixed depth.

An image element from the unseen image is selected 1002. A trained decision tree from the decision forest is also selected 1004. The selected image element is pushed 1006 through the selected decision tree, such that it is tested against the trained parameters at a node, and then passed to the appropriate child in dependence on the outcome of the test, and the process repeated until the image element reaches a leaf node. Once the image element reaches a leaf node, the accumulated votes (from the training stage) associated with this leaf node are stored 1008 for this image element.

If it is determined 1010 that there are more decision trees in the forest, then a new decision tree is selected 1004, the image element pushed 1006 through the tree and the accumulated votes stored 1008. This is repeated until it has been performed for all the decision trees in the forest. Note that the process for pushing an image element through the plurality of trees in the decision forest can also be performed in parallel, instead of in sequence as shown in FIG. 10.

It is then determined 1012 whether further unanalyzed image elements are present in the unseen depth image, and if so another image element is selected and the process repeated. Once all the image elements in the unseen image have been analyzed, then joint position votes are obtained for all image elements.

As the image elements are pushed through the trees in the decision forest, votes accumulate. These accumulated votes are aggregated 1014 to form an overall vote aggregation for each image element. Optionally a sample of votes may be taken for aggregation. For example, N votes may be chosen at random, or by taking the top N weighted votes, and then the aggregation process applied only to those N votes. This enables accuracy to be traded off against speed.

At least one set of joint positions may then be output 1016 where the joint positions may be confidence weighted. This helps any subsequent tracking algorithm (or other process) assess whether the proposal is good or not. More than one set of joint positions may be output; for example, where there is uncertainty. Also, a set of joint positions may comprise nulls for one or more joints. For example, where a joint position is out of the field of view of the imaging sensor and/or where no image elements vote for a joint position.

Figure 11:
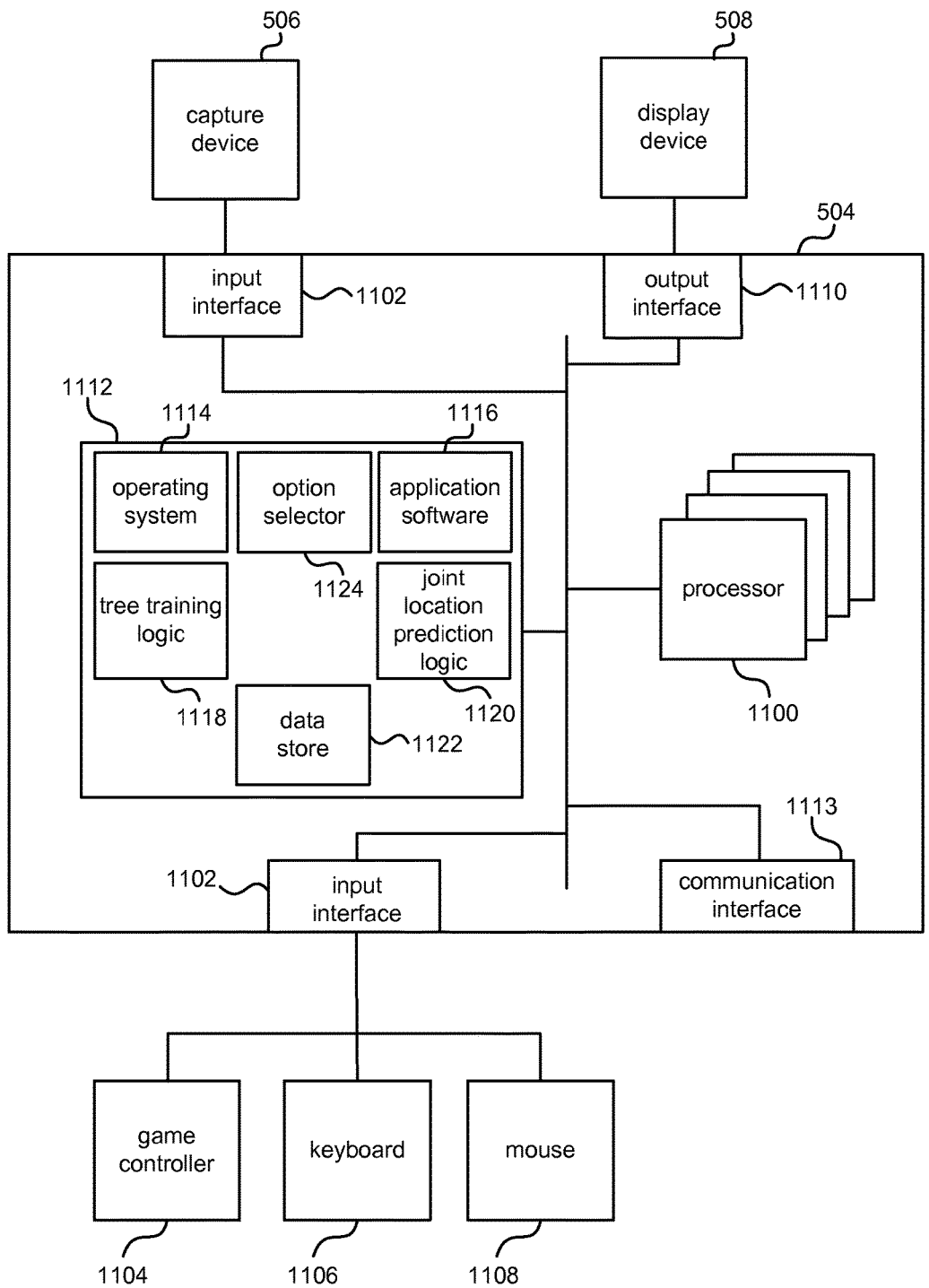
FIG. 11 illustrates an exemplary computing-based device in which embodiments of a machine learning system with an option selector may be implemented.

FIG. 11 illustrates various components of an exemplary computing-based device 504 which may be implemented as any form of a computing and/or electronic device, and in which embodiments of a machine learning system may be implemented. In this example, the computing-based device 504 is arranged to train a random decision forest for joint location prediction (or other tasks) from depth images, for example, to control a game using human body movements. However, this is not essential; other machine learning applications may be provided which involve selecting an option from a plurality of uncertain options.

Computing-based device 504 comprises one or more processors 1100 which may be microprocessors, controllers or any other suitable type of processors for processing computer executable instructions to control the operation of the device in order to operate a machine learning system, for example, to train a random decision forest for joint location prediction or other tasks. In some examples, for example where a system on a chip architecture is used, the processors 1100 may include one or more fixed function blocks (also referred to as accelerators) which implement a part of the method of any of FIGS. 1, 3, 4, 7, 8 and 10 in hardware (rather than software or firmware). Platform software comprising an operating system 1114 or any other suitable platform software may be provided at the computing-based device to enable application software 1116 to be executed on the device. A tree training logic 1118 may be provided to train one or more random decision trees using at least part of the process of FIGS. 7 and 8. An option selector 1124 may be provided which may be any of the option selector, model selector, feature selector and tree split function selector of FIG. 1. A data store 1122 may store an error tolerance value, trained random decision trees, training examples, selected options and other data. In the case that the computing-based device is arranged to carry out joint location detection from depth or other images a joint location prediction logic 1120 is provided. The joint location prediction logic 1120 may implement at least part of the method of FIG. 10.

The computer executable instructions may be provided using any computer-readable media that is accessible by computing based device 504. Computer-readable media may include, for example, computer storage media such as memory 1112 and communications media. Computer storage media, such as memory 1112, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1112) is shown within the computing-based device 504 it will be appreciated that the storage may be distributed or located remotely and accessed via a network or other communication link (e.g. using communication interface 1113).

The computing-based device 504 also comprises an input interface 1102 and an output interface 1110 arranged to output display information to a display device 508 which may be separate from or integral to the computing-based device 504. The display information may provide a graphical user interface. The input interface 1102 is also arranged to receive and process input from one or more devices, such as a user input device (e.g. a mouse 1108, keyboard 1106, game controller 1104, camera 506, microphone or other sensor). In some examples the input interface 1102 may detect voice input, user gestures or other user actions and may provide a natural user interface (NUI). This user input may be used to control a game or other application. In an embodiment the display device 508 may also act as a user input device if it is a touch sensitive display device. The output interface 1110 may also output data to devices other than the display device, e.g. a locally connected printing device.

The input interface 1102, output interface 1110 and optionally the user input devices (game controller 1104, keyboard 1106, mouse 1108, capture device 506) may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method at a machine learning system comprising:
   at a processor, receiving, for each of a plurality of options, a plurality of samples describing behavior of each of the plurality of options, a number of the plurality of samples based at least in part on an automatically determined error tolerance, the error tolerance being based at least in part on an application domain or available computing resources;
   for each option of the plurality of options:
      calculating, by one or more processors, a score using the plurality of samples using a histogram of bin counts, the score comprising a bounded difference statistic; and
      calculating, by the one or more processors, a confidence interval of the score using the plurality of samples by calculating the score for that option, plus or minus a constant multiplied by a square root of an estimated variance of the score multiplied by a logarithm of two divided by the error tolerance; and
   selecting, by the one or more processors, one or more of the plurality of options on a basis of the confidence interval and the score for each of the plurality of options, wherein selecting the one or more options on the basis of the confidence interval for each of the plurality of options comprises:
      determining a highest scoring option of the plurality of options;
      comparing the confidence interval of the highest scoring option of the plurality of options with the confidence interval of a different option of the plurality of options;
      excluding the different option from further consideration when the confidence interval of the highest scoring option and the confidence interval of the different option do not overlap; and
      allocating resources of the machine learning system to the selected one or more options.

2. A method as claimed in claim 1 further comprising:
   based at least on excluding the different option from further consideration, selecting, by the one or more processors, the highest scoring option as the option;
   when the score of the option is less than a threshold, setting the option as a final option;
   when the score of the option is greater than the threshold, selecting options for each child option of the option; and
   when each final option has been set, applying an image element through each of the plurality of options and each final option;
   at each final option, vote for a position of the image element in an image; and
   based at least one an accumulation of each vote, providing the image element at a particular position.

3. A method as claimed in claim 1 wherein the score is selected from one or more of the following: an information gain, a Gini gain, a variance, an entropy.

4. A method as claimed in claim 1 comprising selecting one option from the plurality of options on a basis of the confidence interval and the score for each of the plurality of options such that the selected option has, within the error tolerance, a best score of all the plurality of options.

5. A method as claimed in claim 1 comprising adjusting the calculated confidence interval for bias.

6. A method as claimed in claim 1 where the plurality of options are different families of models.

7. A method as claimed in claim 1 where the plurality of options are features of items.

8. A method as claimed in claim 1 where the plurality of options are decision tree split functions.

9. A method as claimed in claim 1 which is at least partially carried out using hardware logic selected from one or more of the following: a field-programmable gate array, a program-specific integrated circuit, a program-specific standard product, a system-on-a-chip, a complex programmable logic device, and a graphics processing unit.

10. A method as claimed in claim 1, wherein the confidence interval is a range of numerical values representing possible values of the score with a specified accuracy.

11. A method at a machine learning system comprising:
    selecting, by one or more processors, a split function to use at a split node of a random decision tree as part of a process of training the random decision tree using training examples, the selecting comprising:
       calculating, for each split function being considered, a score using a number of the training examples and a histogram of bin counts, the number of training examples being based at least in part on an automatically determined error tolerance, the error tolerance being based at least in part on an application domain or available computing resources, the score comprising a bounded difference statistic;
    for each split function being considered, calculating, by the one or more processors, a confidence interval of the score using samples describing a behavior of a plurality of options by calculating the score for that split function, plus or minus a constant multiplied by a square root of an estimated variance of the score multiplied by a logarithm of two divided by the error tolerance;
    selecting, by the one or more processors, one of the split functions being considered on a basis of:
       the confidence interval and the score for each split function;
       determining a best scoring split function of the split functions being considered;

comparing the confidence interval of the best scoring split function with the confidence interval of a different split function of the split functions being considered; and excluding the different split function from further consideration when the confidence interval of the highest scoring split function and the confidence interval of the different split function do not overlap; and allocating resources of the machine learning system to the selected one or more options.

12. A method as claimed in claim 11 wherein the random decision tree comprising a root node and a plurality of branches, each branch comprising one or more split nodes and a leaf node, and wherein the method further comprises:

based at least one excluding the different split function from further consideration, selecting, by the one or more processors, the highest scoring split function as the split function to use at the split node;

when the score of the split node is less than a threshold, setting the split node as a leaf node;

when the score of the split node is greater than the threshold, selecting split functions for each child node of the split node; and when each leaf node for each of the plurality of branches has been set, applying an image element through each of the plurality of branches;

at each leaf node, vote for a position of the image element in an image; and based at least one an accumulation of each vote, providing the image element at a particular position.

13. A method as claimed in claim 11 comprising selecting one split function on a basis of the confidence interval and the score for each split function being considered such that the selected split function has, within the error tolerance, a best score of all the split functions.

14. A method as claimed in claim 11, wherein the confidence interval is a range of numerical values representing possible values of the score with a specified accuracy.

15. A machine learning apparatus comprising:
a memory;
and one or more processors programmed to perform operations comprising:
select a split function to use at a split node of a random decision tree as part of a process of training the random decision tree using training examples, the selecting comprising:
calculating, for each split function being considered, a score using a number of the training examples and a histogram of bin counts, the number of training examples being based at least in part on an automatically determined error tolerance, the error tolerance being based at least in part on an application domain or available computing resources, the score comprising a bounded difference statistic;
for each split function being considered, calculating a confidence interval of the score using samples describing a behavior of a plurality of options by calculating the score for that split function, plus or minus a constant multiplied by a square root of an estimated variance of the score multiplied by a logarithm of two divided by the error tolerance;
selecting one of the split functions being considered on a basis of:
the confidence interval and the score for each split function;
determining a best scoring split function of the split functions being considered;
comparing the confidence interval of the best scoring split function with the confidence interval of a different split function of the split functions being considered; and
excluding the different split function from further consideration when the confidence interval of the highest scoring split function and the confidence interval of the different split function do not overlap; and
allocating resources of the machine learning system to the selected one or more options.

16. A machine learning apparatus as claimed in claim 15 wherein the random decision tree comprising a root node and a plurality of branches, each branch comprising one or more split nodes and a leaf node.

17. A machine learning apparatus as claimed in claim 16, wherein the one or more processors are further programmed to perform the following operations:
based at least one excluding the different split function from further consideration, selecting the highest scoring split function as the split function to use at the split node;
when the score of the split node is less than a threshold, setting the split node as a leaf node;
when the score of the split node is greater than the threshold, selecting split functions for each child node of the split node; and
when each leaf node for each of the plurality of branches has been set, applying an image element through each of the plurality of branches;
at each leaf node, vote for a position of the image element in an image; and
based at least one an accumulation of each vote, providing the image element at a particular position.

18. A machine learning apparatus as claimed in claim 17, wherein the image element is processed through a plurality of random decision trees prior to providing the image element at the particular position.

19. A machine learning apparatus as claimed in claim 16, wherein the memory comprises racing logic configured to calculate the confidence interval by estimating a variance of the score of the option by calculating a jackknife variance estimate, and wherein the racing logic is at least partially implemented using hardware logic selected from one or more of the following: a field-programmable gate array, a program-specific integrated circuit, a program-specific standard product, a system-on-a-chip, a complex programmable logic device, and a graphics processing unit.

20. A machine learning apparatus as claimed in claim 15, wherein the confidence interval is a range of numerical values representing possible values of the score with a specified accuracy.

* * * * *